2,983,765

AROMATIZATION OF OLEFINS EMPLOYING A TITANIUM TRICHLORIDE CATALYST

James L. Jezl, Swarthmore, and Archibald P. Stuart, Media, Pa., assignors to Sun Oil Company, Philadelphia, Pa., a corporation of New Jersey No Drawing. Filed June 24, 1959, Ser. No. 822,422

3 Claims. (Cl. 260—673.5)

This invention relates to the conversion of olefins, and more particularly to a process for making aromatic compounds from olefins in the presence of a titanium trichloride catalyst.

We have discovered that olefins having six or more carbon atoms per molecule may be converted to high-boiling oils containing a considerable proportion of aromatics by contacting them with at least about 3% by weight of titanium trichloride at a temperature of from about 100° C. to about 350° C. The titanium trichloride is employed as the sole catalytic agent for the reaction. If less than 3% by weight of the catalyst is used, polymerization takes place, but little or no aromatics are formed. Surprisingly, titanium trichloride is the only titanium chloride which shows activity as an aromatization catalyst.

In order that those skilled in the art may more fully appreciate the nature of our invention and the method of carrying it out, the following examples are given.

Example I

A quantity of heptene-1 was placed in a pressure vessel along with 10% by weight of titanium trichloride, and the vessel was sealed. The olefin and catalyst were then heated to 250° C. and were held at this temperature for 12 hours, while stirring the mixture. The vessel was then cooled and the reaction products removed. After separation of catalyst particles from the liquid product it was found that the liquid had a refractive index of 1.4659, as compared to a refractive index of 1.3956 for the heptene-1 charge. 27 ml. of the liquid was then fractionally distilled to yield the following cuts:

| Cut No. | Boiling Range | Amount, ml. | R.I. | Bromine No. |
|---|---|---|---|---|
| 1 | to 92.8° C | 1 | 1.3856 | 2 |
| 2 | 92.8°–114° C | 2 | | |
| 3 | 114°–208° C | 3 | 1.4096 | 7 |
| 4 | 208°–239.8° C | 3 | 1.4328 | 8 |
| 5 | 239.8°–242° C | 3 | 1.4388 | 37 |
| 6 | 242°–262° C | 3 | 1.4424 | 47 |
| 7 | 262°–282.8° C | 3 | 1.4503 | 56 |
| 8 | Residue | 9 | 1.4901 | 14 |

Infrared spectroscopic analysis of cut No. 8 indicated that about one-half the cut consisted of aromatic compounds, chiefly styrenes and indenes. Cuts 4 through 7 also contained some aromatics but consisted mainly of isomeric tetradecanes. The above experiment was repeated twice, using 3.3% by weight of titanium trichloride as catalyst, and 1.0% by weight. The liquid product from the run using 3.3% of the catalyst had a refractive index of 1.4497, and contained a small amount of aromatics. The product from the run using 1% by weight of catalyst had a refractive index of 1.4406, and contained no detectable aromatics.

Example II

The procedure of Example I was followed, using 9.2% by weight of titanium tetrachloride as catalyst. Reaction temperature was 230° C., and the time of reaction was 12.1 hours. Examination of the products indicated that only about 10% of the heptene-1 had reacted to form higher boiling products, chiefly heptene dimer and polymer. No aromatics could be detected in the product, which had a refractive index of 1.3971. Another run was made using 11.8% by weight of titanium dichloride as the catalyst, reaction temperature being 255° C., and reaction time 10 hours. About 15% of the heptene charged reacted to form dimers and polymers. Again, no aromatics could be detected in the liquid product, which had a refractive index of 1.4017.

Example III

In order to determine whether or not the position of the double bond had any effect on the general course of the reaction, other runs were made using heptene-2 and heptene-3 as the charge olefin. In the case of heptene-2, using 10.1% by weight of titanium trichloride, reaction temperature of 235° C., and reaction time of 9.8 hours, the reaction product had a refractive index of 1.4604, and contained a considerable amount of aromatics, identified by infrared spectroscopy as mainly conjugated aromatic alkenes. Using heptene-3 as the charge stock, 10.6% by weight of titanium trichloride as the catalyst, reaction temperature of 240° C. and reaction time of 10 hours, the product had a refractive index of 1.4706, and contained a considerable amount of aromatics. A similar run using heptene-2 as charge, but 10.5% by weight of titanium tetrachloride as the catalyst, yielded a product having a refractive index of 1.4150, containing no aromatics.

The foregoing experiments all used heptene as the charge stock, in order to present consistent data showing the catalytic effect of titanium trichloride as compared to the other titanium halides, but the invention is applicable to the aromatization of any olefin having 6–30 carbon atoms, or mixtures of olefins such as may be obtained by thermally cracking paraffin wax.

The total product produced by the reaction is useful as a high-boiling solvent or as a rubber extender, and the conjugated aromatic alkenes in the reaction product may be separated therefrom and used as monomers for the production of synthetic resins.

The temperature of the reaction may be widely varied over the range of 100° C. to 350° C. Preferably the temperature will be from about 200° C. to 250° C., since at these temperatures the reaction is complete within a reasonable time. At temperatures below this range, the time required for reaction is excessively long, while at higher temperature, in excess of 350° C. there is danger of cracking the product. Pressure is not critical and can be varied widely, for example, within the range of 0.1–100 atmospheres.

This application is a continuation-in-part of our copending application Serial No. 696,059, filed November 13, 1957, now abandoned.

We claim:

1. A process for aromatizing olefins which comprises contacting an olefin having 6–30 carbon atoms per molecule with at least about 3% of its weight of titanium trichloride as the sole catalytic agent, at a temperature within the range of 100° C. to 350° C., for a period of time sufficient to convert the olefin to aromatics at least in part, and recovering a reaction product comprising aromatics.

2. The process according to claim 1 in which the temperature is from about 200° C. to about 300° C.

3. The process according to claim 1 in which said olefin is a heptene.

References Cited in the file of this patent

UNITED STATES PATENTS

| | | |
|---|---|---|
| 2,846,427 | Findlay | Aug. 5, 1958 |
| 2,880,199 | Jezl | Mar. 31, 1959 |

FOREIGN PATENTS

| | | |
|---|---|---|
| 538,782 | Belgium | Dec. 6, 1955 |